June 7, 1960

R. L. KINDRED 2,940,071

ANALOG TO DIGITAL CONVERTER

Filed Jan. 16, 1956

INVENTOR.
R.L. KINDRED

BY Hudson + Young
ATTORNEYS

June 7, 1960 R. L. KINDRED 2,940,071
ANALOG TO DIGITAL CONVERTER
Filed Jan. 16, 1956 3 Sheets-Sheet 2

INVENTOR.
R. L. KINDRED
BY Hudson & Young
ATTORNEYS

INVENTOR.
R. L. KINDRED

Hudson & Young
ATTORNEYS

United States Patent Office 2,940,071
Patented June 7, 1960

2,940,071
ANALOG TO DIGITAL CONVERTER

Raymond L. Kindred, Bartlesville, Okla., assignor to Phillips Petroleum Company, a corporation of Delaware Filed Jan. 16, 1956, Ser. No. 559,170

13 Claims. (Cl. 340—347)

This invention relates to apparatus for converting a voltage into a digital representation.

In various fields of automatic control, a variable to be measured is represented by an analog voltage through the use of appropriate transducing equipment. The final data processing step often involves the use of electronic digital computers. Thus, it is necessary to provide apparatus for converting analog voltages into corresponding digital representations. Such converters are also useful in observing physical measurements. For example, the output signal from a converter of this type can illuminate a series of lamps so that a voltage to be measured is represented in a digital fashion by the illuminated lamps. This relieves the operator from the task of interpreting data and often results in a more accurate measurement.

In accordance with the present invention apparatus is provided to express analog voltages in digital form. A self-balancing potentiometer principle of voltage measurement is employed in this instrument. A reference voltage is applied across the potentiometer and the voltage at the contactor is compared with the voltage to be measured. The difference between these voltages is utilized to control the setting of the potentiometer contactor. The potentiometer is in the form of a plurality of voltage dividing networks which are associated with a plurality of stepping switches. The output of the voltage comparing means is applied through appropriate relays to energize selected ones of the stepping relays until the two voltages are equal. A series of lamps can be associated with the stepping switches so that the voltage can be measured is represented in a digital fashion by selected lamps being illuminated Accordingly, it is an object of this invention to provide apparatus for expressing a voltage to be measured in digital form.

Another object is to provide apparatus for converting analog voltages into signals suitable for introduction into digital computers.

Other objects, advantages and features of the invention should become apparent from the following detailed description taken in conjunction wtih the accompanying drawing in which.

In a conventional null balance servomechanism, the feedback potentiometer is continuously variable and is driven by a motor or other device which is capable of reversing its direction of rotation. Apparatus of this type is generally considered to be an analog system. A digital representation differs from the analog in that it is not continuous. This means that a voltage or shaft position representing a number must take on definite values in steps. The apparatus of the present invention utilizes a series of stepping switches which are unidirectional in operation. In apparatus of this type the settings of the switches must be accomplished without a reversal of the switching direction.

Figure 1:
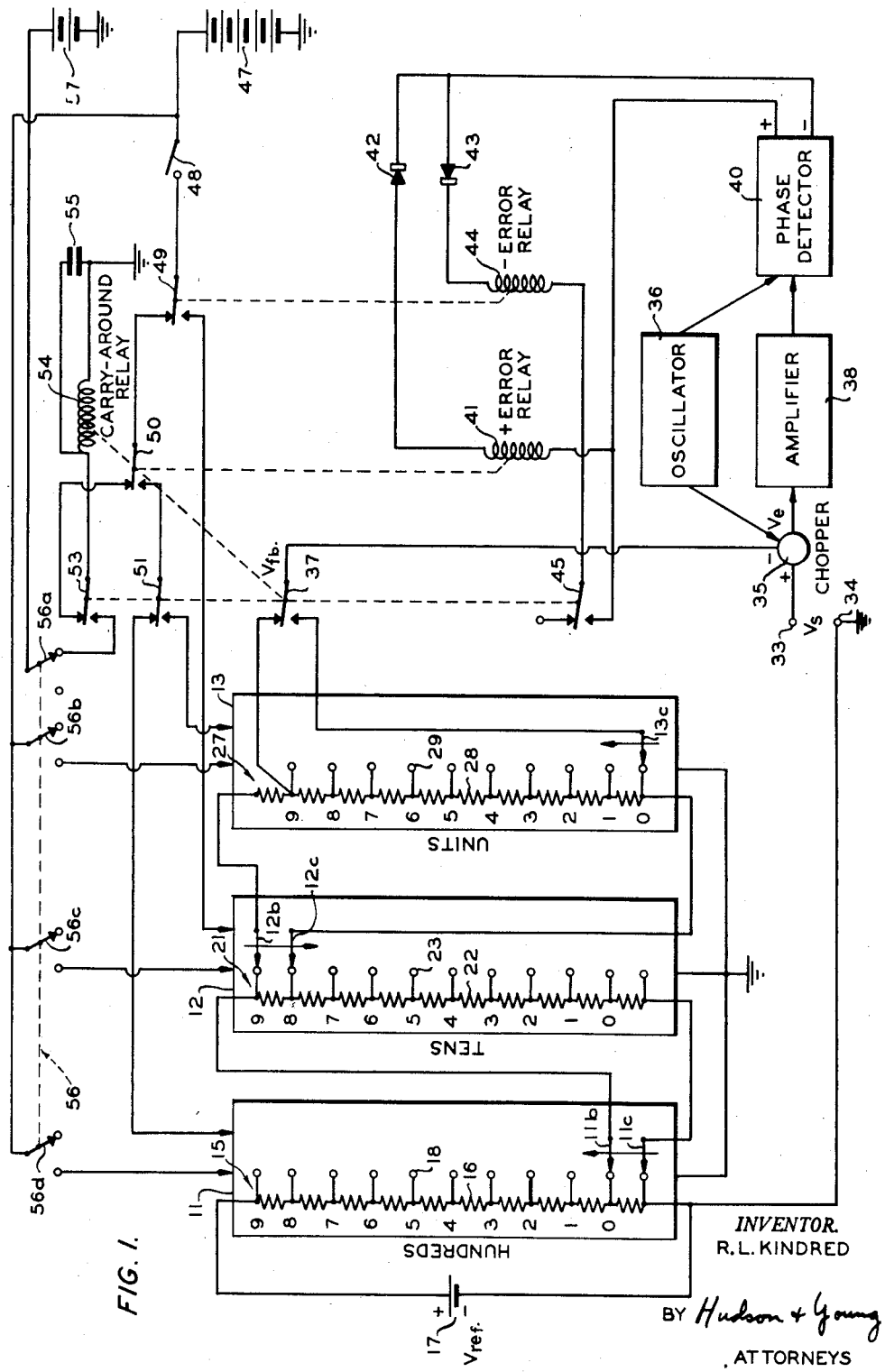
Figure 1 is a schematic representation of a present preferred embodiment of the converter of this invention.

In Figure 1 there is shown a schematic representation of three stepping switches 11, 12 and 13. These switches represent the hundreds, tens and units of the desired digital representation. A first voltage dividing network 15 is associated with stepping switch 11. This network comprises ten resistors 16 which are connected in series relationship with a source of reference potential ($V_{ref.}$) 17. Eleven contacts 18 of stepping switch 11 are connected to the junctions between resistors 16. The upper ten of these contacts are designated by the numerals 0, 1, 2 . . . 9. Stepping switch 11 is provided with a pair of contacts 11b and 11c which are mechanically coupled to one another and which move in unison to engage respective adjacent contacts 18 when the stepping switch is energized.

A second voltage dividing network 21 is associated with stepping switch 12. Network 21 comprises ten resistors 22 which are connected in series relationship. Contacts 23 are connected to the junctions between these resistors. The first end terminal of network 21 is connected to contact 11c of switch 11 and the second end terminal of network 21 is connected to contact 11b of switch 11. Switch 12 is provided with a pair of contacts 12b and 12c which are mechanically connected to one another and which move to engage adjacent pairs of contacts 23 when switch 12 is energized. Switches 12b and 12c move in a direction opposite the direction of the movement of switches 11b and 11c so as to engage in sequence the contacts 23 which are designated by numerals 9, 8, 7 . . . 0.

A third voltage dividing network 27 is associated with stepping switch 13. This network comprises ten resistors 28, which are connected in series relationship. The first end terminal of network 27 is connected to contact 12c and the second end terminal of network 27 is connected to contact 12b. A series of contacts 29 are connected to the junctions between resistors 28. Stepping switch 13 is provided with a single switch 13c which moves to engage the contacts designated by the numerals 0, 1, 2 . . . 9 in sequence when the stepping switch is energized.

The direct current analog voltage to be measured ($V_s$) is applied between input terminals 33 and 34. One of these input terminals is connected to ground. Terminal 34 is connected to the negative terminal of potential source 17 and to the first end terminal of network 15. Terminal 33 is connected to the first input terminal of a chopper 35 which is energized at a predetermined frequency by an oscillator 36. The second input terminal of chopper 35 is connected to a relay switch 37. Switch 37 engages a first contact in its "up" position which is connected to the uppermost terminal 9 of stepping switch 13. Switch 37 engages a second contact in its "down" position which is connected to switch 13c of stepping switch 13. Throughout the following description the relay switches will be described as occupying upper or lower positions. The contacts engaged by these switches in the two positions will be referred to as the "upper" and "lower" contacts. This terminology is employed merely to simplify the description.

The output signal of chopper 35 is applied to the input terminal of an amplifier 38 which is tuned to pass signals of the frequency of oscillator 36. The output terminals of oscillator 36 and amplifier 38 are connected to the respective input terminals of a phase detector 40. The first output terminal of phase detector 40 is connected through the coil of a positive error relay 41 and a rectifier 42 to the second output terminal of phase detector 40. The second output terminal of phase detector 40 is connected through a rectifier 43 and the coil of a negative error relay 44 to a switch 45. The lower contact of switch 45 is connected to the first output terminal of phase detector 40.

Stepping switches 11, 12 and 13 are energized from a current source 47. One terminal of source 47 is connected to ground, as are first terminals of the stepping switches. The second terminal of source 47 is connected through a switch 48 to a switch 49 which is actuated by relay 44. The upper contact of switch 49 is connected to a switch 50 which is actuated by relay 41. The lower contact of switch 50 is connected to a switch 51. The upper contact of switch 51 is connected to stepping switch 11 and the lower contact of switch 51 is connected to stepping switch 13. The lower contact of switch 49 is connected to stepping switch 12. The upper contact of switch 50 is connected to the upper contact of a switch 53. Switch 53 is connected to ground through the coil of a "carry-around" relay 54. A capacitor 55 is connected in parallel with the coil of relay 54. The lower contact of switch 53 is connected through a switch 56a to the first terminal of a current source 57. The second terminal of source 57 is connected to ground. The first terminal of source 47 is connected through respective switches 56b, 56c and 56d to stepping switches 13, 12 and 11, respectively. Switches 56a, 56b, 56c and 56d are elements of switch 56 and are operated in unison. Switches 45, 37, 51 and 53 are actuated in unison by relay 54. The various switches occupy the illustrated positions in the absence of current being supplied to the associated relays.

In explaining the operation of the apparatus thus far described it will be assumed that the initial value of the feedback voltage applied to chopper 35 is 0.099 of the reference voltage supplied by source 17. This value corresponds to the stepping switches occupying the illustrated positions. If the signal voltage to be measured is greater than the feedback voltage, a positive output signal is provided by phase detector 40 which energizes relay 41. When switch 48 is closed to start the operation the stepping current from source 47 is applied through the upper contact of switch 49, the lower contact of switch 50 and the upper contact of switch 51 to stepping switch 11. Stepping switch 11 continues to be actuated until the feedback voltage is equal to 0.N99 of the reference voltage. This value is equal to or greater than the signal voltage to be measured. The error voltage ($V_e$) thus becomes zero or negative so that relay 41 is deenergized. At this time source 47 is connected through the upper contacts of switches 49, 50 and 53 to relay 54 so that this relay is energized. This moves switch 37 to the lower position so that the feedback voltage becomes 0.N90 of the reference voltage. This value can be either greater or less than the signal voltage. In the more general case, the feedback voltage is greater than the signal voltage so that the error voltage is negative and relay 44 is energized. It should be noted that this relay cannot become energized until relay 54 is energized to close switch 45. The reason for this is explained hereinafter. When relay 44 is energized source 47 is connected directly to stepping switch 12 which causes switch 12b to move downwardly to a contact considered as N'. The feedback voltage is then 0.NN'0 of the reference voltage. This value can be either equal to or less than the signal voltage. If the feedback voltage is equal to the signal voltage the process is complete. However, in the more general case the feedback voltage again becomes less than the signal voltage so that relay 41 is once again energized. At this time source 47 is applied to stepping switch 13 because switch 51 is in engagement with its lower contact. Switch 13c of stepping switch 13 thus moves until the feedback voltage is substantially equal to the signal voltage. The positions of switches 11b, 12b and 13c thus represent the signal voltage in digital form which is correct to three significant figures.

If the signal voltage is initially equal to or less than 0.099 of the reference voltage, the "carry-around" relay 54 is energized as soon as switch 48 is closed. The setting procedure is then the same as previously described. If the signal voltage has the value of 0.N9N", the original error voltage is positive when carry-around relay 54 becomes energized so that stepping switch 12 does not become actuated. Stepping switch 13 operates in the manner previously described.

The stepping relays remain in the final positions until the reset mechanism is actuated by switch 56. This closes switches 56b, 56c and 56d and opens switch 56a. Current source 47 is then applied to the reset mechanism of the three stepping switches to move the switch arms back to the initial positions.

Figure 2:
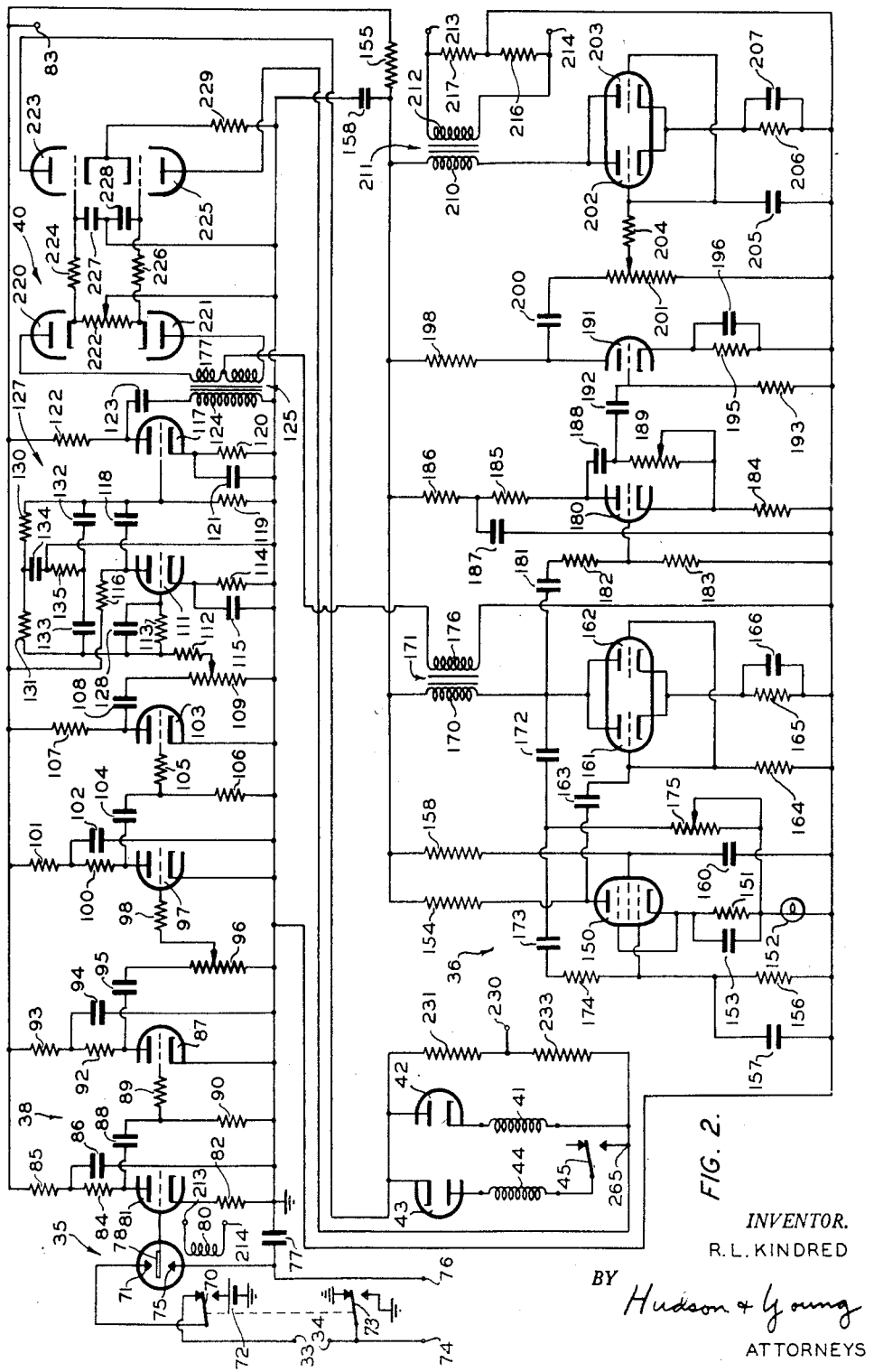
Figure 2 is a more detailed circuit diagram of the voltage comparison circuit of Figure 1.

The voltage comparing circuit of Figure 1 is illustrated in detail in Figure 2. Input terminal 33 is connected to the upper contact of a switch 70. Switch 70 is connected to the first stationary terminal 71 of chopper 35. The lower terminal of switch 70 is connected to the first terminal of a voltage source 72. The second terminal of voltage source 72 is connected to ground. Voltage source 72 is provided to calibrate the instrument in the manner described in greater detail hereinafter. Input terminal 34 is connected to a switch 73 and to a terminal 74 which is connected to the voltage dividing network illustrated in Figure 3. The lower contact of switch 73 is connected to ground. Switches 70 and 73 are mechanically coupled and normally occupy the illustrated "up" positions so that source 72 is removed from the circuit. The second stationary terminal 75 of chopper 35 is connected to a terminal 76 which also is connected to the voltage dividing network illustrated in Figure 3. A capacitor 77 is connected between terminal 76 and ground. The moving contact 78 of chopper 35 alternately engages terminals 71 and 75 at the frequency of current supplied to a coil 80 which is positioned adjacent element 78. The vibrating element 78 is connected to the control grid of a triode 81 which forms the first stage of amplifier 38.

The cathode of triode 81 is connected to ground through a resistor 82. The anode of triode 81 is connected to a positive potential terminal 83 through series connected resistors 84 and 85. A capacitor 86 is connected between ground and the junction between resistors 84 and 85. The anode of triode 81 is connected to the control grid of a second triode 87 through a capacitor 88 and resistor 89 which are connected in series relationship. A resistor 90 is connected between ground and the junction between capacitor 88 and resistor 89. The cathode of triode 87 is connected directly to ground. The anode of triode 87 is connected to terminal 83 through series connected resistors 92 and 93. A capacitor 94 is connected between ground and the junction between these resistors. The anode of triode 87 is connected to ground through a capacitor 95 and a potentiometer 96 which are connected in series relationship. The contactor of potentiometer 96 is connected to the control grid of a third triode 97 through a resistor 98.

The cathode of triode 97 is connected directly to ground. The anode of triode 97 is connected to terminal 83 through series connected resistors 100 and 101. A capacitor 102 is connected between ground and the junction between these resistors. The anode of triode 97 is connected to the control grid of a fourth triode 103 through a capacitor 104 and a resistor 105 which are connected in series relationship. A resistor 106 is connected between ground and the junction between capacitor 104 and resistor 105. The cathode of triode 103 is connected directly to ground. The anode of triode 103 is connected to terminal 83 through a resistor 107.

The anode of triode 103 is connected to ground through a capacitor 108 and a potentiometer 109. The contactor of potentiometer 109 is connected to the control grid of a fifth triode 111 through series connected resistors 112 and 113.

The circuit thus far described comprises a three-stage clipper amplifier with a pre-amplifier. Resistors 89, 98 and 105 are provided to reduce the amplitude of the transmitted signal so that the signal applied to the control grid of triode 111 is independent of the amplitude of the input signal within rather wide limits. The output signal of amplifier 38 is of a phase which depends upon the relative amplitudes of the two signals applied to chopper 35. It is desired that this signal be of substantially constant amplitude in order that the phase thereof can readily be detected by phase detector 40. The various coupling resistors are fairly large to provide the desired clipping. The signal at the arm of potentiometer 109 is substantially of square wave form and is of the same frequency as the signal applied to coil 80 of chopper 35.

The cathode of triode 111 is connected to ground through a resistor 114 which is shunted by a capacitor 115. The anode of triode 111 is connected to terminal 83 through a resistor 116. The anode of triode 111 is connected to the control grid of a sixth triode 117 through a capacitor 118. The control grid of triode 117 is connected to ground through a resistor 119. The cathode of triode 117 is connected to ground through a resistor 120 which is shunted by a capacitor 121. The anode of triode 117 is connected to terminal 83 through a resistor 122. The anode of triode 117 is connected to ground through a capacitor 123 and the primary winding 124 of a transformer 125. Transformer 125 provides the first input of phase detector 40.

A parallel-T filter 127 is connected in series relationship with a capacitor 128 between the control grid of triode 117 and the control grid of triode 111. Filter 127 comprises series connected resistors 130 and 131 connected in parallel with series connected capacitors 132 and 133. The junction between resistors 130 and 131 is connected to ground through a capacitor 134. The junction between capacitors 132 and 133 is connected to ground through a resistor 135. Filter 127 is tuned to the frequency of the signal transmitted by amplifier 38. This results in the output signal from the amplifier having substantially a sinusoidal wave form.

Oscillator 36 can advantageously comprise a Wein bridge oscillator of the form illustrated in Figure 2. This oscillator comprises a pentode 150 which has the cathode thereof connected to ground through a resistor 151 and a regulating lamp 152. A capacitor 153 is connected in parallel with resistor 151. The anode of pentode 150 is connected to terminal 83 through series-connected resistors 154 and 155. The junction between these resistors is connected to ground through a capacitor 158. The control grid of pentode 150 is connected to ground through a resistor 156 which is shunted by a capacitor 157. The suppressor grid of pentode 150 is connected to the cathode thereof. The screen grid of pentode 150 is connected to terminal 83 through series connected resistors 158 and 155 and to ground through a capacitor 160. The anode of pentode 150 is connected to the control grids of a pair of parallel connected triodes 161 and 162 through a capacitor 163. The control grids of these triodes are connected to ground through a resistor 164. The cathodes of triodes 161 and 162 are connected to ground through a resistor 165 which is shunted by a capacitor 166. The anodes of triodes 161 and 162 are connected to terminal 83 through the primary winding 170 of a transformer 171 and resistor 155. The anodes of triodes 161 and 162 are connected to the control grid of pentode 150 through capacitors 172 and 173 and a resistor 174 which are connected in series relationship. The junction between capacitors 172 and 173 is connected to the junction between resistors 151 and lamp 152 through a variable resistor 175.

One end terminal of the secondary winding 176 of transformer 171 is connected to the center tap of the secondary winding 177 of transformer 125. The second end terminal of transformer winding 176 is connected to ground. The output signal from oscillator 36 is thus applied to the second input of phase detector 40. The frequency of the output signal from oscillator 36 is the same as the frequency of the signal from amplifier 38 because chopper 35 is energized from a second output of oscillator 36.

The anodes of triodes 161 and 162 are connected to the control grid of a triode 180 through a capacitor 181 and a resistor 182 which are connected in series relationship. The control grid of triode 180 is connected to ground through a resistor 183. The cathode of triode 180 is connected to ground through a resistor 184. The anode of triode 180 is connected to terminal 83 through series connected resistors 185, 186 and 155. A capacitor 187 is connected between ground and the junction between resistors 185 and 186. The anode of triode 180 is connected to the cathode thereof through a capacitor 188 and a variable resistor 189 which are connected in series relationship. The junction between capacitor 188 and resistor 189 is connected to the control grid of a triode 191 through a capacitor 192. The control grid of triode 191 is connected to ground through a resistor 193. The cathode of triode 191 is connected to ground through a resistor 195 which is shunted by a capacitor 196. The anode of triode 191 is connected to terminal 83 through series-connected resistors 198 and 155. The anode of triode 191 is connected to ground through a capacitor 200 and potentiometer 201 which are connected in series relationship. The contactor of potentiometer 201 is connected to the control grids of a pair of parallel connected triodes 202 and 203 through a resistor 204. The control grids of these triodes are connected to ground through a capacitor 205. The cathodes of the two triodes are connected to ground through a resistor 206 which is shunted by a capacitor 207. The anodes of triodes 202 and 203 are connected to terminal 83 through the primary winding 210 of a transformer 211 and resistor 155. The end terminals of the secondary winding 212 of transformer 211 are connected to respective terminals 213 and 214 which in turn are connected to coil 80 of chopper 35. Resistors 216 and 217 are connected in series relationship between terminals 213 and 214. The junction between these resistors is connected to ground.

A portion of the output signal from oscillator 36 is thus amplified to energize chopper 35. Capacitor 188 and resistor 189 provide a phase shift network which can be adjusted so that the two signals applied to transformer 125 are either in phase with one another or 180° out of phase, depending upon the relative amplitudes of the signal and feedback voltages being compared. This network is provided to compensate for any phase shift which may result through the output chopper drive section of oscillator 36 and through amplifier 38.

The relative phase of the two signals applied to transformer 125 is determined by the relative amplitudes of the two signals applied to the inputs of chopper 35. The end terminals of transformer winding 177 are connected to the anodes of diodes 220 and 221 respectively. The cathodes of these diodes are connected to one another through a potentiometer 222. The contactor of potentiometer 222 is connected to ground. The cathode of diode 220 is connected to the control grid of a triode 223 through a resistor 224. The cathode of diode 221 is connected to the control grid of a triode 225 through a resistor 226. The control grids of triodes 223 and 225 are connected to ground through capacitors 227 and 228, respectively. Resistors 224 and 226 and capacitors 227 and 228 thus provide filter networks for the output signals from diodes 220 and 221. The anode of triode 223 is connected to the cathode of diode 43 and to the anode of diode 42. The anode of diode 225 is connected to the cathode of diode 42 through relay coil 41 and to the anode of diode 43 through switch 45 and relay coil 44. The anode of diode 223 is also connected to a positive potential terminal 230 through a resistor 231. The anode of diode 225 is connected to terminal 230 through a resistor 233.

The circuit is connected so that diode 42 conducts to energize coil 41 if the potential applied to terminal 71 of chopper 35 is greater than the potential applied to terminal 75. If the potential applied to terminal 75 is greater than the potential applied to terminal 71 diode 43 conducts to energize coil 44 if switch 45 is in the "down" position.

Figure 3:
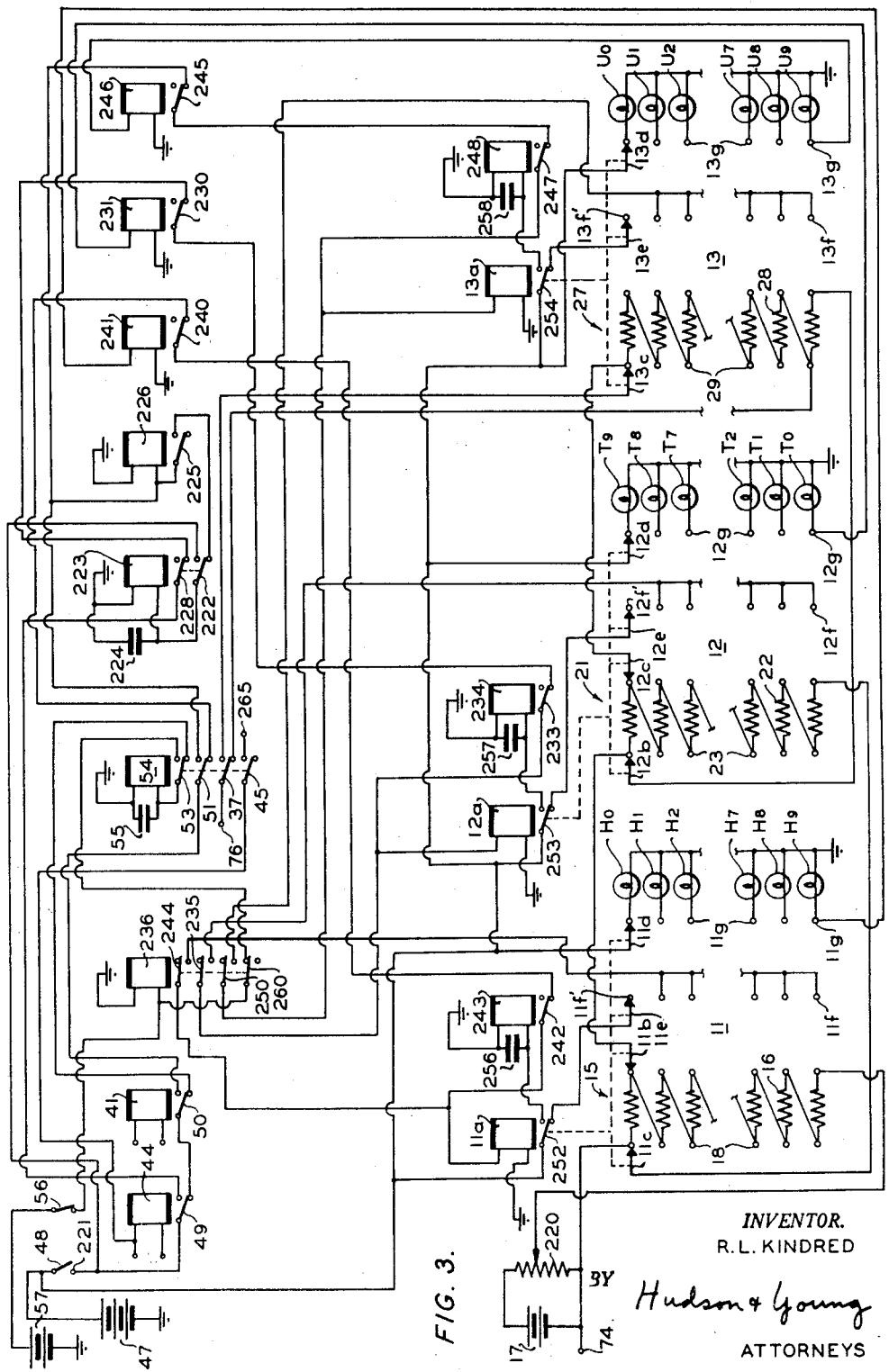
Figure 3 is a more detailed schematic circuit of the stepping switches and relays of Figure 1.

The voltage dividing network and the associated switch circuit are illustrated in Figure 3. Reference potential source 17 is applied across the end terminals of a potentiometer 220. The contactor and one end terminal of potentiometer 220 are connected to the respective end terminals of voltage dividing network 15. Potentiometer 220 thus provides an adjustable reference voltage. Stepping switch 11 comprises four switch arms 11b, 11c, 11d and 11e which are moved in unison when a driving coil 11a is energized. Switch arms 11b and 11c move so as to be connected across adjacent resistors 16. Switch arm 11d moves to contact terminals 11g. Terminals 11g are connected to ground through respective indicator lamps $H_0$, $H_1$, $H_2$ ... $H_9$. Switch arm 11e moves to engage a terminal 11f' or one of a plurality of terminals 11f. The several contacts on stepping switch 11 are actually arranged in a circular path so that the switch arms move successively from the illustrated zero position to the 9 position and then back to the zero position. The switch arms move one position each time coil 11a is energized.

Stepping switch 12 is generally similar to switch 11 and for this reason is not described in detail. It should be noted, however, that the several switch arms initially are in the "9" position. These switch arms move downwardly toward the zero position when coil 12a is energized. The indicator lamps are designated by letters T. Stepping switch 13 also is generally similar to stepping switch 11. Switch 13, however, differs from switch 11 in that only a single switch arm 13c is provided in conjunction with voltage dividing network 27.

Current source 47 is connected through switch 48 to a terminal 221. Terminal 221 is connected to the "up" contact of a switch 222 which is actuated by a relay 223. Switch 222 is connected to ground through the coil of relay 223 which is shunted by a capacitor 224. The "down" contact of switch 222 is connected to the "up" contact of a switch 225 which is actuated by a relay 226. Switch 225 is connected to ground through the coil of relay 226. Terminal 221 is also connected to switch 49 which is actuated by negative error relay 44. The "down" contact of switch 49 is connected to switch 50 which is actuated by positive error relay 41. The "down" contact of switch 50 is connected to the "down" contact of switch 53. Switch 53 is connected to ground through the coil of relay 54 which is shunted by capacitor 55. The "up" position of switch 49 is connected to a switch 228 which is actuated by relay 223. The "down" contact of switch 228 is connected to the "down" contact of a switch 230 which is actuated by a relay 231. Switch 230 is connected to the "down" contact of a switch 233 which is actuated by a relay 234. Switch 233 is connected to ground through the coil of stepping switch 12a. Switch 233 is also connected to a switch 235 which is actuated by a relay 236. The "down" contact of switch 235 is connected to terminals 12f of stepping switch 12.

The "up" contact of switch 50 is connected to switch 51. The "down" contact of switch 51 is connected to the "down" contact of a switch 240. Switch 240 is connected to the "down" contact of a switch 242 which is actuated by a relay 243. Switch 242 is connected to ground through the coil of relay 11a. Switch 242 is also connected to a switch 244 which is actuated by relay 236.

The "down" contact of switch 244 is connected to terminals 11f of stepping switch 11. The "up" contact of switch 51 is connected to the "down" contact of a switch 245 which is actuated by a relay 246. Switch 245 is connected to the "down" contact of a switch 247 which is actuated by relay 248. Switch 247 is connected to ground through the coil of stepping switch 13a. Switch 247 is also connected to a switch 250 which is actuated by relay 236. The "down" contact of switch 250 is connected to terminals 13f of stepping switch 13.

Switch arm 11e is connected to the "down" contact of a switch 252 which is actuated by stepping switch coil 11a. Switch 252 is connected to the positive terminal of current source 47. Switch arm 12e is connected to the "down" contact of a switch 253 which is actuated by stepping switch coil 12a. Switch 253 is connected to the positive terminal of current source 47. Switch arm 13e is connected to the "down" contact of a switch 254 which is actuated by stepping switch 13a. Switch 254 is connected to the positive terminal of current source 47. Switch arms 11d, 12d and 13d are connected to the positive terminal of current source 47.

The "up" contact of switch 252 is connected to ground through the coil of relay 243 which is shunted by a capacitor 256. The "up" contact of switch 253 is connected to ground through the coil of relay 234 which is shunted by a capacitor 257. The "up" contact of switch 254 is connected to ground through the coil of relay 248 which is shunted by a capacitor 258.

The lowermost terminals 11g, 12g and 13g of respective stepping switches 11, 12 and 13 are connected to ground through the coils of relays 241, 231 and 246, respectively.

The positive terminal of current source 57 is connected to ground through switch 56 and the coil of relay 236. This potential terminal is also connected to a switch 260 which is actuated by relay 236. The "up" contact of switch 260 is connected to the "up" contact of switch 53. Switch arm 13c of stepping switch 13 is connected to the "up" contact of switch 37. The lowermost left hand terminal 29 of voltage dividing network 27 is connected to the "down" contact of switch 37. Switch 37 is connected to terminal 76 of Figure 2.

In one particular application of this invention the apparatus was designed to measure direct current voltages from zero to 1000 millivolts. In order to explain the operation of the stepping switches and relays of Figure 3 it will be assumed that a voltage of 753 millivolts is applied between terminals 33 and 34 of Figure 2, terminal 34 being grounded. If the stepping switches of Figure 3 are initially in the illustrated positions the feedback voltage between terminals 74 and 76 is equal to 99 millivolts. Because the signal voltage is greater than the feedback voltage, positive error relay 41 is energized initially. Switch 48 is closed when it is desired to measure the signal voltage by the stepping switches. Closure of switch 48 results in current flowing from source 47 through switches 49, 50, 51, 240 and 242 and the coil of stepping switch 11a. This results in coil 11a being energized so that the switch arms of stepping switch 11 are moved downwardly one position. In particular stepping switches which have been used, the energizing of coil 11a causes a spring loaded ratchet to be set. When the coil 11a is deenergized, the arms are moved downwardly by the ratchet. Switch 252 is moved upwardly when coil 11a is energized and this results in relay 243 being energized from current source 47. When relay 243 is energized switch 242 is opened so that coil 11a is deenergized. This opens switch 252 to deenergize relay 243. However, relay 243 does not deenergize immediately because of the charge on capacitor 256. After a predetermined interval switch 242 moves downwardly so that coil 11a is once again energized. This results in the switch arms of stepping switch 11 moving downwardly a second step. Capacitor 256 introduces sufficient delay in the stepping operation to prevent the switch arms overshooting the desired value. This operation continues until the switch arms of stepping switch 11 are moved downwardly so as to be opposite lamp $H_7$. At this position the feedback voltage to chopper 35 becomes 799 millivolts which is greater than the signal voltage of 753 millivolts.

As soon as the feedback voltage exceeds the signal voltage positive error relay 41 becomes deenergized. Current then flows from source 47 through switches 49, 50 and 53 to "carry-around" relay 54. When relay 54 becomes energized a circuit is completed between the coil of the relay and source 57 through switches 53 and 260. Carry-around relay 54 thus remains energized as long as switch 56 remains closed. It should be observed that relay 236 is energized at this time. When relay 54 is energized switch 37 moves upwardly so that the uppermost terminal 29 of voltage dividing network 27 is connected to terminal 76 in place of the lowermost left-hand terminal 29. This results in the stepback voltage being decreased to 790 millivolts. Because this feedback voltage is still greater than the signal voltage, negative error relay 44 becomes energized. This results in coil 12a being connected in circuit with source 47 through switches 48, 49, 228, 230 and 233. The switch arms of stepping switch 12 then move downwardly in a stepwise fashion until they are opposite lamp $T_5$. Coils 12a and 234 cooperate with one another to provide such movement. At this final position of the switch arms the feedback voltage becomes 750 milivolts.

The signal voltage is once again greater than the feedback voltage so that the positive error relay 41 is again energized. This results in the coil of stepping switch 13a being connected in circuit with source 47 through switches 48, 49, 50, 51, 245 and 247. Coils 13a and 248 cooperate with one another so that the switch arms of stepping switch 13 are moved downwardly to a position adjacent lamp $U_3$. This completes the stepping operation. Lamps $H_7$, $T_5$ and $U_3$ are illuminated to provide a digital representation (753) of the signal voltage being measured.

If the signal to be measured is initially less than 99 millivolts, the error voltage is initially negative. The negative error relay 44 can not operate because relay 54 has not closed switch 45. Thus, switch 37 closes first to cause a change of 9 millivolts in $V_{fb}$. This action may cause either of relays 41 or 44 to operatae, depending upon the value of the signal being measured.

When it is desired to reset the mechanism, switch 56 is opened. This deenergizes relay 236. Coil 11a is connected in circuit with source 47 through switch 244, a contact 11f, switch arm 11e and switch 252. This circuit remains completed until switch arm 11e is returned to the position adjacent contact 11f'. Stepping switch 12 is returned to the initial position by coil 12a being connected in circuit with source 47 through switch 253, a contact 12f, switch arm 12e and switch 235. Stepping switch 13 is returned to the initial position by coil 13a being connected in circuit with source 47 through switch 250, a contact 13f, switch arm 13e and switch 254.

Relays 241, 231 and 246 prevent their respective stepping switches from moving past their last positions. This breaks the circuit between coil 11a and source 47 so that stepping switch 11 cannot move beyond the lowermost illustrated position. Relays 231 and 246 serve the same functions with respect to stepping switches 12 and 13. Relays 223 and 226 eliminate the need for critical gain adjustment in the amplifier. These relays disconnect the driving voltage from coil 12a the second time positive error relay 41 is energized. This insures that the second time the error voltage becomes negative switch 21 will remain at rest.

Actuation of switches 70 and 73 of Figure 2 applies a reference voltage 72 to input terminals 33 and 34. Potentiometer 220 of Figure 3 can then be adjusted if necessary until the reading of the converter is indicative of the value of reference voltage 72.

In view of the foregoing description of a present preferred embodiment of this invention, it should be evident that there is provided apparatus to convert an analog voltage into a digital representation. The magnitude of the signal voltage is indicated by certain lamps being illuminated. Obviously the currents through the lamps can be directed to input circuits of a digital computer if it is desired to apply the analog voltage to the input of such a computer. Starting switch 48 and reset switch 56 can be operated by suitable timing mechanism if it is desired to measure signal voltages at predetermined times.

While the invention has been described in conjunction with a present preferred embodiment, it should be evident that it is not limited thereto.

What is claimed is:

1. Apparatus for converting a voltage into a digital representation comprising a first voltage dividing network, a reference potential applied across said first network, a second voltage dividing network means for connecting the end terminals of said second network to respective first and second spaced points on said first network, a third voltage dividing network means for connecting the end terminals of said third network to respective third and fourth spaced points on said second network, voltage comparing means, means for applying the voltage to be converted to the first input of said comparing means, means for applying a voltage between a fifth point on said third network and one end terminal of said first network to the second input of said comparing means, and means responsive to the output of said comparing means to adjust one by one in a predetermined sequence the positions of said points on said networks until the two voltages applied to said comparing means are equal, the positions of said points being representative of the magnitude of the voltage to be converted.

2. Apparatus for converting a voltage into a digital representation comprising a first voltage dividing network, a reference potential applied across said first network, a second voltage dividing network means for connecting the end terminals of said second network to respective first and second spaced points on said first network, means for comparing voltages and having first and second inputs, means for applying the voltage to be converted to the first input of said comparing means, means for applying a voltage between a selected one of a third point and a fourth point on said second network and one end terminal of said first network to the second input of said comparing means, one of said third and fourth points being fixed, means for selecting one of said third and fourth points responsive to a change in sign of an output signal from said comparing means, and means responsive to the output of said means for comparing to adjust the positions of said points on said networks by moving the first said means and the fourth said means in respective different directions until the two voltages applied to said comparing means are substantially equal, said respective different directions being the only directions in which the respective means do move, the positions of said points being representative of the magnitude of the voltage to be converted.

3. Apparatus for converting a voltage into a digital representation comprising a first voltage dividing network, a reference potential applied across said first network, a second voltage dividing network means for connecting the end terminals of said second network to respective first and second spaced points on said first network, a third voltage dividing network means for connecting the end terminals of said third network to respective third and fourth spaced points on said second network, voltage comparing means, means for applying the voltage to be converted to the first input of said comparing means, means for applying a voltage between a fifth point on said third network and one end terminal of said first network to the second input of said comparing means, a first stepping switch to move said first and second points in one direction only on said first network when energized, a second stepping switch to move said third and fourth points in one direction only on said second network when energized, a third stepping switch to move said fifth point on said third network in one direction only when energized, and means responsive to the output of said comparing means to energize said stepping switches in sequence until the two voltages applied to said comparing means are substantially equal, the positions of said points being representative of the magnitude of the voltage to be converted.

4. Apparatus for converting a direct current voltage into a digital representation comprising a first voltage dividing network, a direct current reference potential applied across said first network, a second voltage dividing network means for connecting the end terminals of said second network to respective first and second spaced points on said first network, a third voltage dividing network means for connecting the end terminals of said third network to respective third and fourth spaced points on said second network, means for comparing voltages and having first and second inputs and an output, means for applying the voltage to be converted to the first input of said comparing means, means for applying a voltage between a fifth point on said third network and one end terminal of said first network to the second input of said comparing means, a first stepping switch to move said first and second points on said first network when energized, a second stepping switch to move said third and fourth points on said second network when energized, a third stepping switch to move said fifth point on said third network when energized, and means responsive to the output of said comparing means to energize said stepping switches in sequence until the two voltages applied to said means for comparing are substantially equal, the positions of said points being representative of the magnitude of the voltage to be converted.

5. Apparatus for converting a direct current voltage into a digital representation comprising a first voltage dividing network, a direct current reference potential applied across said first network, a second voltage dividing network means for connecting the end terminals of said second network to respective first and second spaced points on said first network, a third voltage dividing network means for connecting the end terminals of said third network to respective third and fourth spaced points on said second network, means for comparing voltages and having first and second inputs and an output, means for applying the voltage to be converted to the first input of said comparing means, means for applying a voltage between a fifth point on said third network and one end terminal of said first network to the second input of said comparing means, a first stepping switch to move said first and second points in one direction only on said first network when energized, a second stepping switch to move said third and fourth points in one direction only on said second network when energized, a third stepping switch to move said fifth point on said third network in one direction only when energized, and means responsive to the output of said comparing means to energize said first stepping switch until the voltage applied to said first input is not less than the voltage applied to said second input and then to energize said second stepping switch until the voltage applied to said second input is no greater than the voltage applied to said first input and then to energize said third stepping switch until the voltages applied to said first and second inputs are substantially equal, the positions of said points being representative of the magnitude of the voltage to be converted.

6. The combination in accordance with claim 3 further comprising means to render said first and second stepping switches inoperative following movement thereof responsive to a difference in the voltages being compared.

7. The combination in accordance with claim 3 further comprising means to delay the stepping of said stepping switches predetermined times to prevent movement of the points on said networks past the balance positions.

8. The combination in accordance with claim 1 further comprising a plurality of indicating means associated with each of said networks, and means to energize respective ones of said indicating means responsive to the positions of said points one each of said networks.

9. The combination in accordance with claim 1 further comprising switching means to move the points on said networks to initial positions.

10. Apparatus for converting a direct current voltage into a digital representation comprising a first voltage dividing network, a direct current reference potential applied across said first network, a second voltage dividing network means for connecting the end terminals of said second network to respective first and second spaced points on said first network, a third voltage dividing network means for connecting the end terminals of said third network to respective third and fourth spaced points on said second network, a voltage comparing means having first and second inputs and further comprising a vibrator which is adapted to engage said first and second inputs alternately, an oscillator to drive said vibrator at a predetermined frequency, an amplifier having the input thereof connected to said vibrator, a phase detector, and means for applying the outputs of said amplifier and said oscillator to the inputs of said phase detector, the polarity of the output of said phase detector being representative of the relative magnitudes of the voltages applied to said first and second inputs means for applying the voltage to be converted to said first input of said comparing means, means for applying a voltage between a fifth point on said third network and one end terminal of said first network to said second input of said comparing means, a first stepping switch to move said first and second points on said first network when energized, a second stepping switch to move said third and fourth points on said second network when energized, a third stepping switch to move said fifth point on said third network when energized, and means responsive to the output of said comparing means to energize said first stepping switch until the voltage applied to said first input is no less than the voltage applied to said second input and then to energize said second stepping switch until the voltage applied to said second input is no greater than the voltage applied to said first input and then to energize said third stepping switch until the voltages applied to said first and second inputs are substantially equal, the positions of said points being representative of the magnitude of the voltage to be converted.

11. Apparatus for coverting a direct current voltage into a digital representation comprising a first voltage dividing network, a direct current reference potential applied across said first network, a second voltage dividing network means for connecting the end terminals of said second network to respective first and second spaced points on said first network, a third voltage dividing network means for connecting the end terminals of said third network to respective third and fourth spaced points on said second network, a voltage comparing means having first and second inputs and further comprising a vibrator which is adapted to engage said first and second inputs alternately, an oscillator to drive said vibrator at a predetermined frequency, an amplifier for providing output signals of substantially constant amplitude when the input signals applied thereto are greater than a predetermined value, said amplifier having the input thereof connected to said vibrator, a phase detector, and means for applying the outputs of said amplifier and said oscillator to the inputs of said phase detector, the polarity of the output of said phase detector being representative of the relative magnitudes of the voltages applied to said first and second inputs, means for applying the voltage to be converted to said first input of said comparing means, means applying a voltage between a fifth point on said third network and one end terminal of said first network to said second input of said comparing means, a first stepping switch to move said first and second points on said first network when energized, a second stepping switch to move said third and fourth points on said second network when energized, a third stepping switch to move said fifth point on said third network when energized, and means responsive to the output of said comparing means to energize said first stepping switch until the voltage applied to said first input is not less than the voltage applied to said second input and then to energize said second stepping switch until the voltage applied to said second input is no greater than the voltage applied to said first input and then to energize said third stepping switch until the voltages applied to said first and second inputs are substantially equal, the positions of said points being representative of the magnitude of the voltage to be converted.

12. Apparatus for converting a direct current voltage into a digital representation comprising a first voltage dividing network, a direct current reference potential applied across said first network, a second voltage dividing network means for connecting the end terminals of said second network to respective first and second spaced points on said first network, a third voltage dividing network means for connecting the end terminals of said third network to respective third and fourth spaced points on said second network, voltage comparing means, means for applying the voltage to be converted to the first input of said comparing means, means for applying a voltage between a fifth point on said third network and one end terminal of said first network to the second input of said comparing means, a first stepping switch to move said first and second points on said first network when energized, a second stepping switch to move said third and fourth points on said second network when energized, a third stepping switch to move said fifth point on said third network when energized, and means responsive to the output of said comparing means to energize said first stepping switch until the voltage applied to said first input is not less than the voltage applied to said second input and then to energize said second stepping switch until the voltage applied to said second input is no greater than the voltage applied to said first input and then to energize said third stepping switch until the voltages applied to said first and second inputs are substantially equal, the positions of said points being representative of the magnitude of the voltage to be converted, the last said means comprising first and second relay coils, means to energize said first coil responsive to the output of said comparing means being representative of the voltage applied to said first input being greater than the voltage applied to said second input, means to energize said second coil responsive to the output of said comparing means being representative of the voltage applied to said second input being less than the voltage applied to said first input, said stepping switches being energized responsive to said coils being energized.

13. Apparatus for converting a voltage into a digital representation comprising a first voltage dividing network, a reference potential applied across said first network, a second voltage dividing network means for connecting the end terminals of said second network to respective first and second spaced points on said first network, a third voltage dividing network means for connecting the end terminals of said third network to respective third and fourth spaced points on said second network, voltage comparing means, means for applying the voltage to be converted to the first input of said comparing means, means for applying a voltage between a fifth point on said third network and one end terminal of said first network to the second input of said comparing means, a first stepping switch to move said first and second points on said first network when energized, a second stepping switch to move said third and fourth points on said second network when energized, a third stepping switch to move said fifth point on said third network when energized, a first coil associated with each of said stepping switches for energizing said stepping switches, means to delay the stepping of said stepping switches predetermined times to prevent movement of the points on said networks past the balance positions, said means to delay comprising a second coil associated with each of said switches, a first switch which is closed responsive to said first coil being energized, a second switch which is opened responsive to said second coil being energized means for applying current to said first coil through said second switch, and means for applying current to said second coil through said first switch, and means responsive to the output of said comparing means to energize said stepping switches in sequence until the two voltages applied to said comparing means are substantially equal, the positions of said points being representative of the magnitude of the voltage to be converted.

References Cited in the file of this patent

UNITED STATES PATENTS

| | | |
|---|---|---|
| 2,497,961 | Shaw | Feb. 21, 1950 |
| 2,508,424 | Rouy | May 23, 1950 |
| 2,625,822 | Nichols | Jan. 20, 1953 |
| 2,775,754 | Sink | Dec. 25, 1956 |
| 2,896,198 | Bennett | July 21, 1959 |